United States Patent
Anjanappa et al.

[11] Patent Number: 5,918,105
[45] Date of Patent: Jun. 29, 1999

[54] CUTTING TOOLS FOR DRILLING CONCRETE, AGGREGATE, MASONRY OR THE LIKE MATERIALS

[75] Inventors: Muniswamappa Anjanappa, Ellicott City; Stephen R. Crosby, White Hall; Russell M. Timmons, Lutherville, all of Md.; John D. Williams, Champaign, Ill.; Thomas Trevor Bludis, Baltimore, Md.; Udo Koehler, York, Pa.

[73] Assignees: Black & Decker Inc., Newark, Del.; University of Maryland Baltimore County, Baltimore, Md.

[21] Appl. No.: 08/747,695

[22] Filed: Nov. 12, 1996

Related U.S. Application Data

[60] Division of application No. 08/513,586, Aug. 10, 1995, abandoned, which is a continuation-in-part of application No. 08/354,349, Dec. 12, 1994, abandoned.

[51] Int. Cl.$^6$ ..................................................... B22F 5/00
[52] U.S. Cl. ............................................. 419/66; 419/38
[58] Field of Search .......................................... 419/38, 66

[56] References Cited

U.S. PATENT DOCUMENTS

| | | | |
|---|---|---|---|
| 335,469 | 2/1886 | Moreau | 175/395 |
| 923,514 | 6/1909 | Hardsocg | 175/389 |
| 1,017,352 | 2/1912 | Wagner | 408/224 |
| 1,106,966 | 8/1914 | Pauli | 175/412 |
| 1,324,631 | 12/1919 | Usrey | 175/414 |
| 1,847,302 | 3/1932 | Emmons | 408/44 |
| 2,051,525 | 8/1936 | Howard | 255/64 |
| 2,237,901 | 4/1941 | Chun | 77/68 |
| 2,294,969 | 9/1942 | Engvall et al. | 77/65 |
| 2,522,045 | 9/1950 | Knowles | 255/64 |
| 2,524,570 | 10/1950 | Phipps | 255/72 |
| 2,635,856 | 4/1953 | Scheffer | 255/69 |
| 2,650,071 | 8/1953 | Rassieur | 255/61 |
| 2,673,714 | 3/1954 | Hargrave | 255/61 |
| 2,673,716 | 3/1954 | Avery | 255/64 |
| 2,747,231 | 5/1956 | Reinhardt | 18/59.3 |
| 2,865,606 | 12/1958 | Farmer | 255/63 |
| 2,877,985 | 3/1959 | Petersen | 255/61 |
| 2,879,036 | 3/1959 | Wheeler | 255/61 |
| 2,890,021 | 6/1959 | Sandvig | 255/64 |
| 2,902,260 | 9/1959 | Tilden | 255/69 |
| 2,950,523 | 8/1960 | Frommelt et al. | 29/95 |
| 2,969,846 | 1/1961 | Sandvig | 175/418 |

(List continued on next page.)

FOREIGN PATENT DOCUMENTS

| | | |
|---|---|---|
| 961029 | 1/1975 | Canada . |
| 0006417 | 1/1980 | European Pat. Off. . |
| 0169402 | 1/1986 | European Pat. Off. . |
| 0187971A2 | 7/1986 | European Pat. Off. . |
| 0107651B1 | 12/1986 | European Pat. Off. . |
| 0251220A1 | 1/1988 | European Pat. Off. . |
| 0287904B1 | 3/1993 | European Pat. Off. . |
| 0364458B1 | 11/1993 | European Pat. Off. . |
| 0350239B1 | 6/1995 | European Pat. Off. . |

(List continued on next page.)

*Primary Examiner*—Daniel J. Jenkins
*Attorney, Agent, or Firm*—Harness, Dickey & Pierce, P.L.C.

[57] ABSTRACT

A cutting tool (500) has a longitudinally extending shaft portion (588) with a chucking part (509) and a cutting head (506). A pressed powder cutting insert (518) with a cutting edge (520) is on the cutting head (506). The cutting edge (520) includes at least one cutting portion. A rake surface (524) is formed adjacent to at least one of the cutting portions (520) with the rake face (524) being at a rake angle from about 0° to 10°. A clearance face (526) is formed adjacent to the at least one cutting portion opposite the rake face (524). The clearance face (526) is at a clearance angle from about 10° to 50°. An edge radius (540) between the rake face (524) and the clearance face (526) is at a radius of from about 0.0015 to about 0.004 inch. The edge radius 540 is formed during pressing of the powder to form the insert, thus, enabling the insert to be directly braised into the cutting head (506).

5 Claims, 10 Drawing Sheets

U.S. PATENT DOCUMENTS

| | | | |
|---|---|---|---|
| 3,198,270 | 8/1965 | Horvath | 175/410 |
| 3,199,381 | 8/1965 | Mackey | 77/70 |
| 3,674,101 | 4/1972 | Chromy | 175/389 |
| 3,760,894 | 9/1973 | Pitifer | 175/413 |
| 3,765,496 | 10/1973 | Flores et al. | 175/383 |
| 3,845,829 | 11/1974 | Schaumann | 175/395 |
| 3,893,353 | 7/1975 | Lahmeyer | 76/108 T |
| 4,143,723 | 3/1979 | Schmotzer | 175/410 |
| 4,210,215 | 7/1980 | Peetz et al. | 175/394 |
| 4,243,113 | 1/1981 | Kliene | 175/410 |
| 4,286,677 | 9/1981 | Guex | 175/395 |
| 4,294,319 | 10/1981 | Guergen | 175/389 |
| 4,314,616 | 2/1982 | Rauckhorst et al. | 175/394 |
| 4,342,368 | 8/1982 | Denman | 175/410 |
| 4,503,920 | 3/1985 | Clement | 175/394 |
| 4,527,643 | 7/1985 | Horton et al. | 175/329 |
| 4,549,616 | 10/1985 | Rumpp et al. | 175/394 |
| 4,568,227 | 2/1986 | Hogg | 408/224 |
| 4,579,180 | 4/1986 | Peetz et al. | 175/394 |
| 4,642,003 | 2/1987 | Yoshimura | 408/144 |
| 4,696,355 | 9/1987 | Haussmann | 175/395 |
| 4,729,441 | 3/1988 | Peetz et al. | 175/385 |
| 4,765,419 | 8/1988 | Scholz et al. | 175/415 |
| 4,817,742 | 4/1989 | Whysong | 175/410 |
| 4,889,200 | 12/1989 | Moser | 175/394 |
| 4,903,787 | 2/1990 | Moser et al. | 175/410 |
| 4,906,294 | 3/1990 | von Haas et al. | 75/228 |
| 4,924,953 | 5/1990 | Moser | 175/323 |
| 4,951,761 | 8/1990 | Peetz et al. | 175/398 |
| 4,967,855 | 11/1990 | Moser | 175/394 |
| 4,976,325 | 12/1990 | Garbarino | 175/394 |
| 4,979,984 | 12/1990 | Anderson . | |
| 4,984,944 | 1/1991 | Pennington, Jr. et al. | 408/223 |
| 5,172,775 | 12/1992 | Sheirer et al. | 175/57 |
| 5,181,811 | 1/1993 | Hosoi | 408/230 |
| 5,265,688 | 11/1993 | Rumpp et al. | 175/394 |
| 5,265,989 | 11/1993 | Stöck | 408/227 |
| 5,269,387 | 12/1993 | Nance | 175/420.1 |
| 5,312,209 | 5/1994 | Lindblom | 408/230 |
| 5,350,261 | 9/1994 | Takaya et al. | 408/229 |
| 5,375,672 | 12/1994 | Peay et al. | 175/420.1 |
| 5,423,640 | 6/1995 | Lindblom et al. | 408/230 |
| 5,433,281 | 7/1995 | Black | 175/420.1 |

FOREIGN PATENT DOCUMENTS

| | | |
|---|---|---|
| 783708 | 7/1935 | France . |
| 151171 | 6/1903 | Germany . |
| 199063 | 5/1906 | Germany . |
| 516866 | 1/1931 | Germany . |
| 763921 | 7/1949 | Germany . |
| 919402 | 9/1954 | Germany . |
| 924014 | 1/1955 | Germany . |
| 1193899 | 6/1965 | Germany . |
| 2211532 | 9/1973 | Germany . |
| 2422452A1 | 11/1975 | Germany . |
| 2510298 | 9/1976 | Germany . |
| 2528003 | 1/1977 | Germany . |
| 2542001A1 | 3/1977 | Germany . |
| 2828872A1 | 4/1979 | Germany . |
| 2841679 | 4/1980 | Germany . |
| 29 42 314 A1 | 4/1980 | Germany . |
| 2910323 | 10/1980 | Germany . |
| 3102053A1 | 2/1982 | Germany . |
| 31 12 497 A1 | 4/1982 | Germany . |
| 3123048C2 | 6/1983 | Germany . |
| 82342415 | 6/1983 | Germany . |
| 83373063 | 4/1984 | Germany . |
| 3426977A1 | 1/1986 | Germany . |
| 3500202 | 7/1986 | Germany . |
| 3803910A1 | 8/1988 | Germany . |
| 37 07 798 A1 | 9/1988 | Germany . |
| 3908674A1 | 10/1989 | Germany . |
| 37 13 334 C2 | 4/1991 | Germany . |
| 4003375C1 | 5/1991 | Germany . |
| 59-166405 | 9/1984 | Japan . |
| 626896 | 9/1978 | U.S.S.R. . |
| 1023062 | 6/1983 | U.S.S.R. . |
| 519475 | 3/1940 | United Kingdom . |
| 832238 | 4/1960 | United Kingdom . |
| 948107 | 1/1964 | United Kingdom . |
| 1270347 | 4/1972 | United Kingdom . |
| 2075409 | 11/1981 | United Kingdom . |
| 2260283 | 4/1993 | United Kingdom . |
| WO 8801214 | 2/1988 | WIPO . |

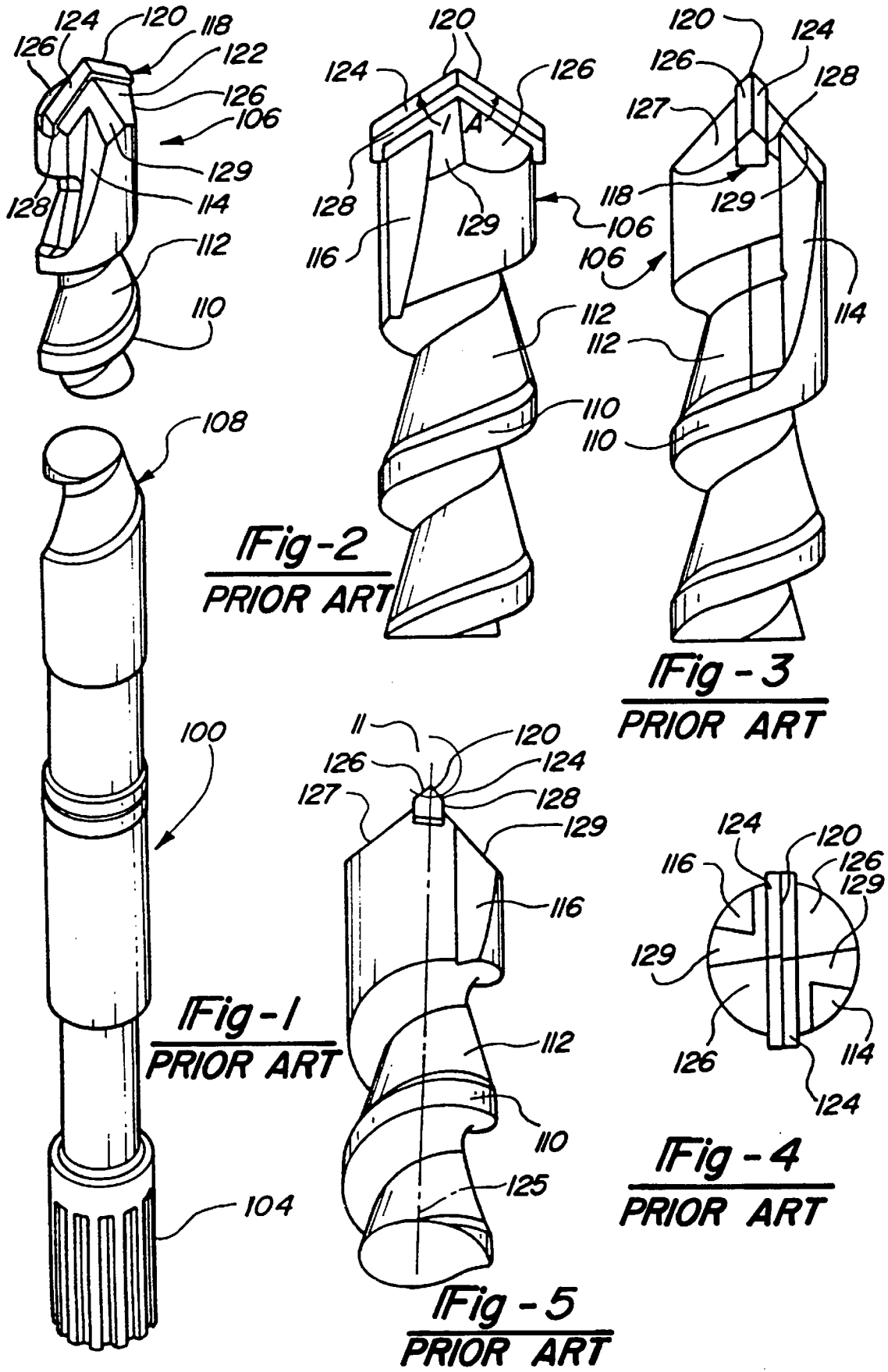

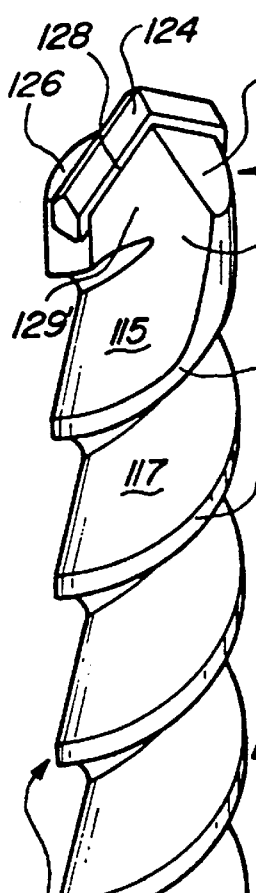
Fig-6
PRIOR ART
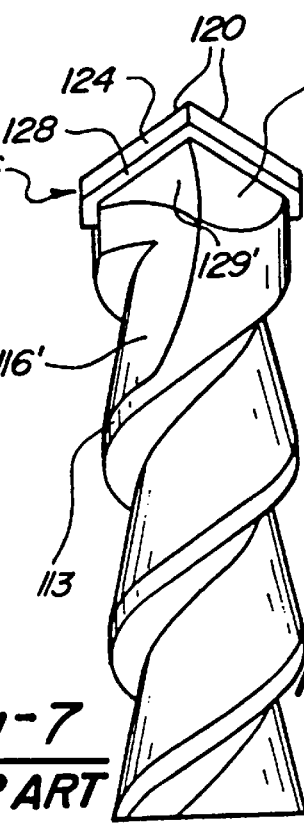
Fig-7
PRIOR ART
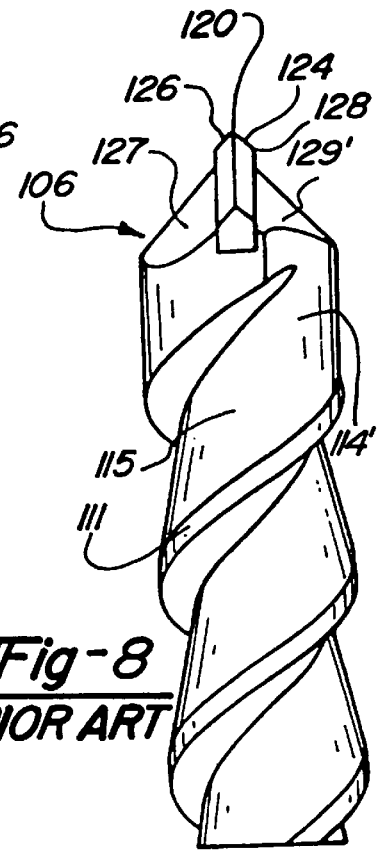
Fig-8
PRIOR ART
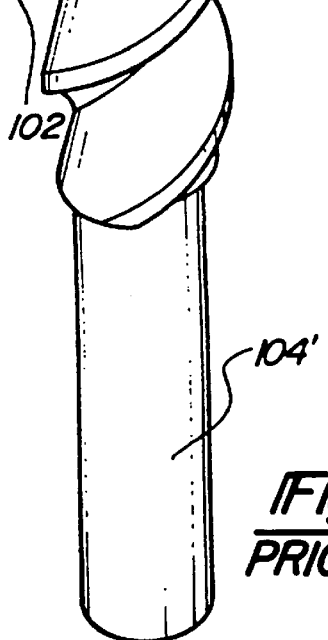
Fig-10
PRIOR ART
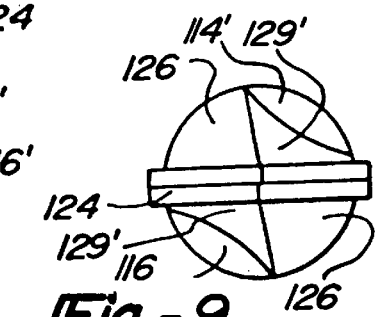
Fig-9
PRIOR ART
Fig-11
PRIOR ART

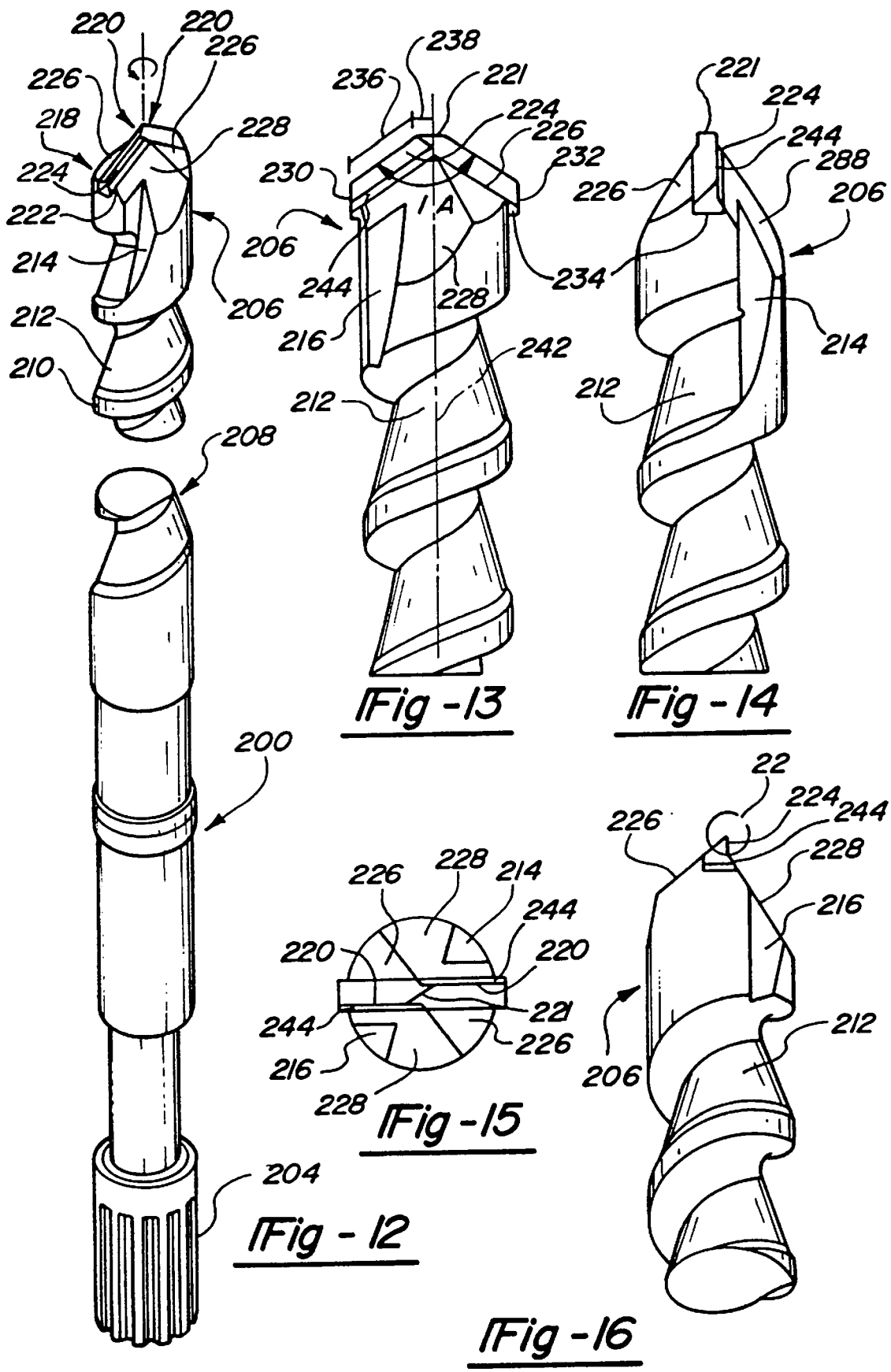

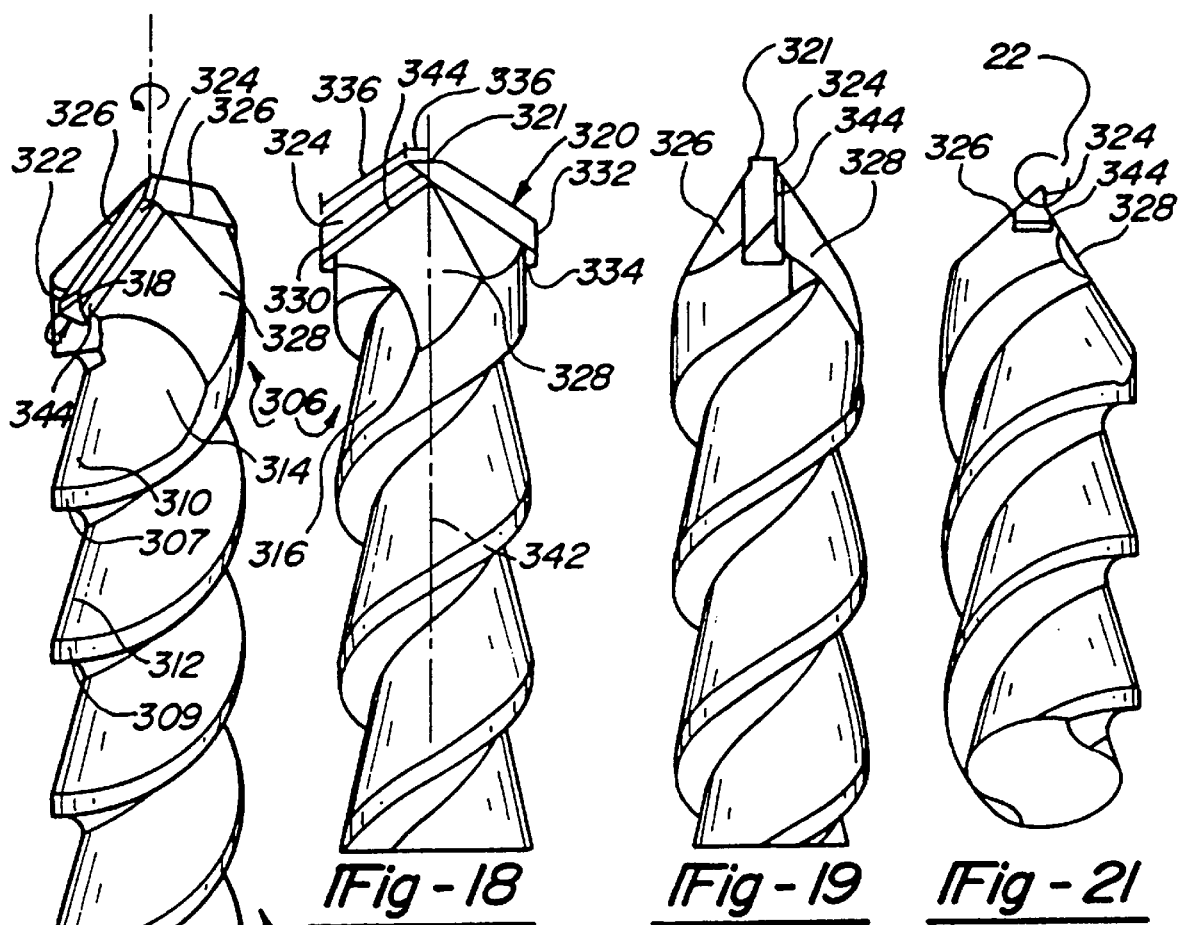
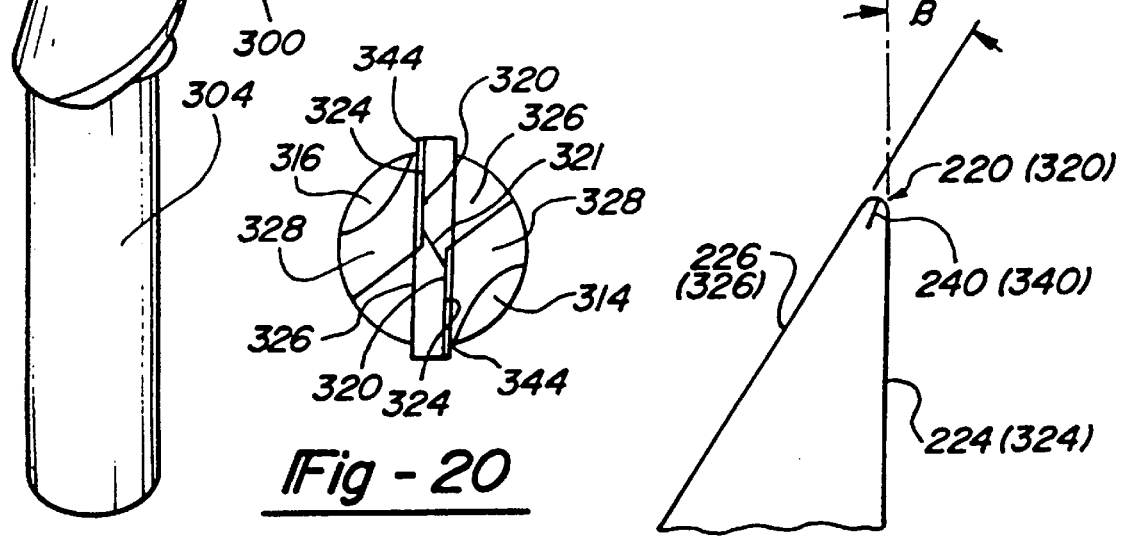

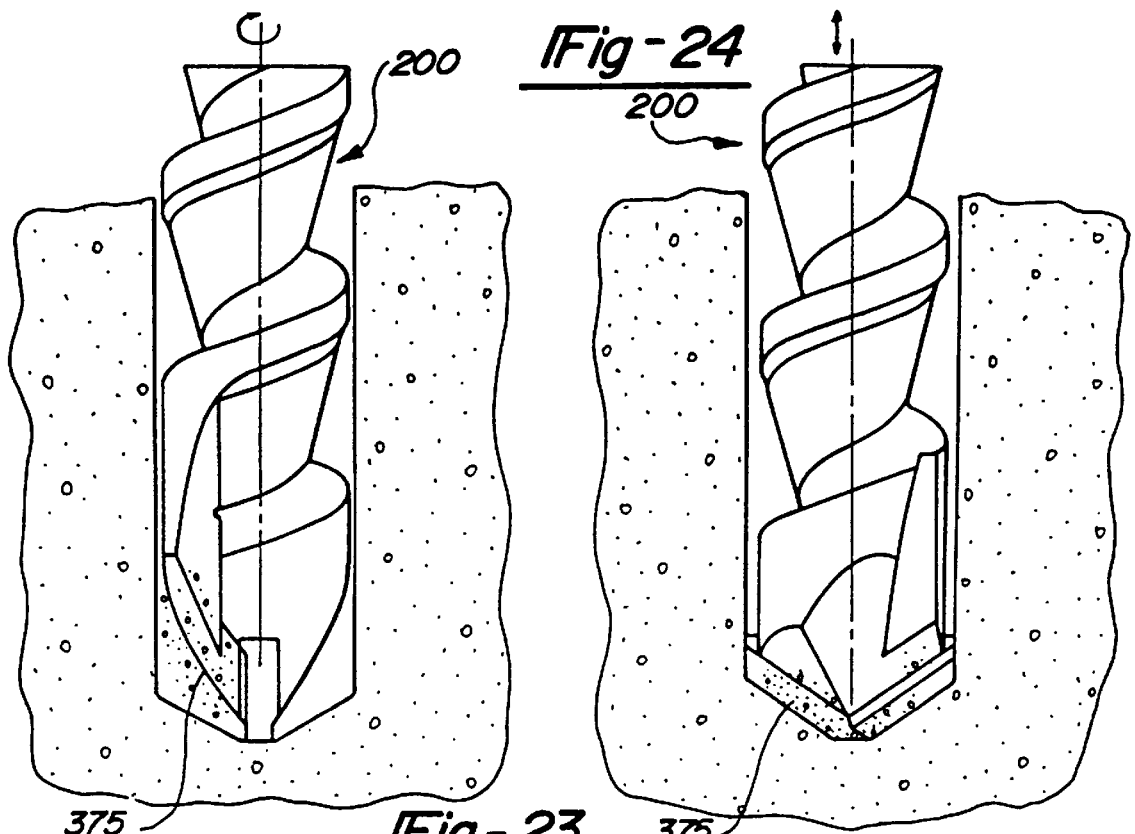
Fig-23
Fig-24
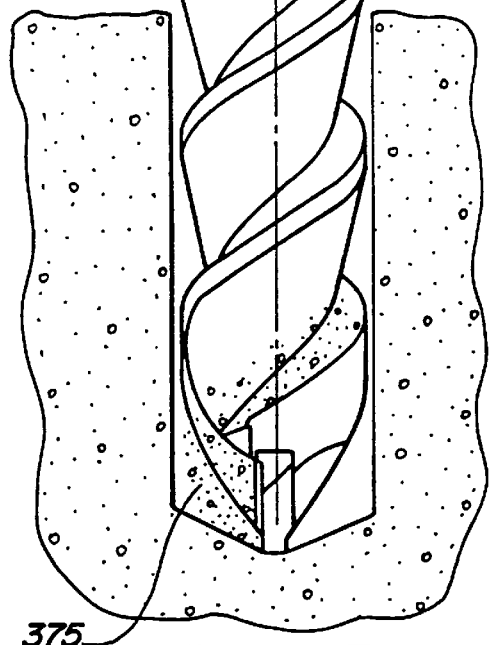
Fig-25
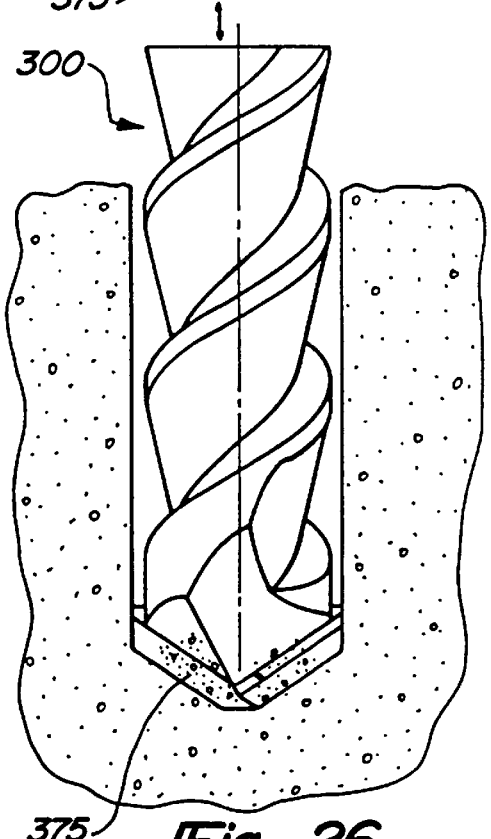
Fig-26

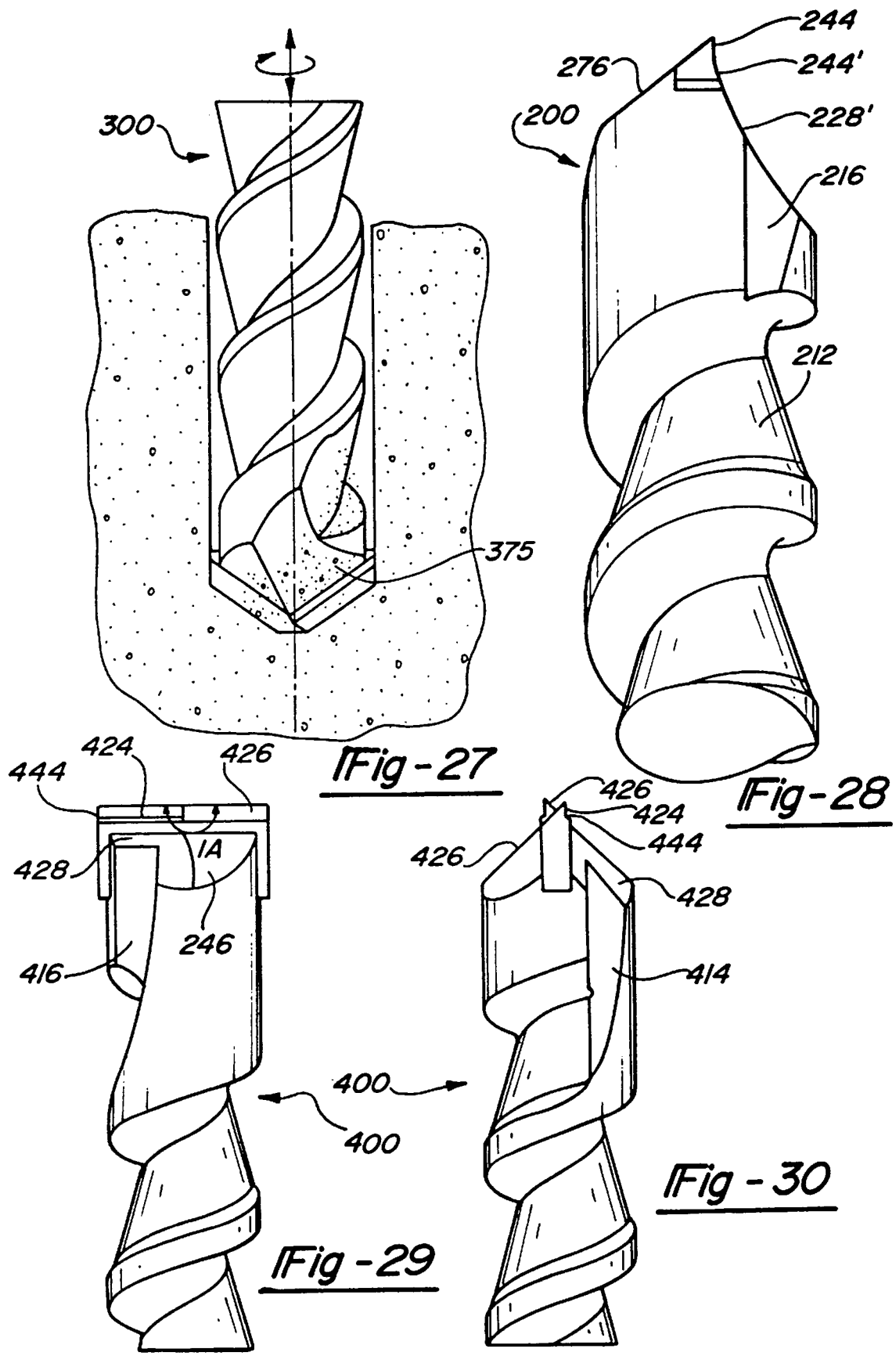

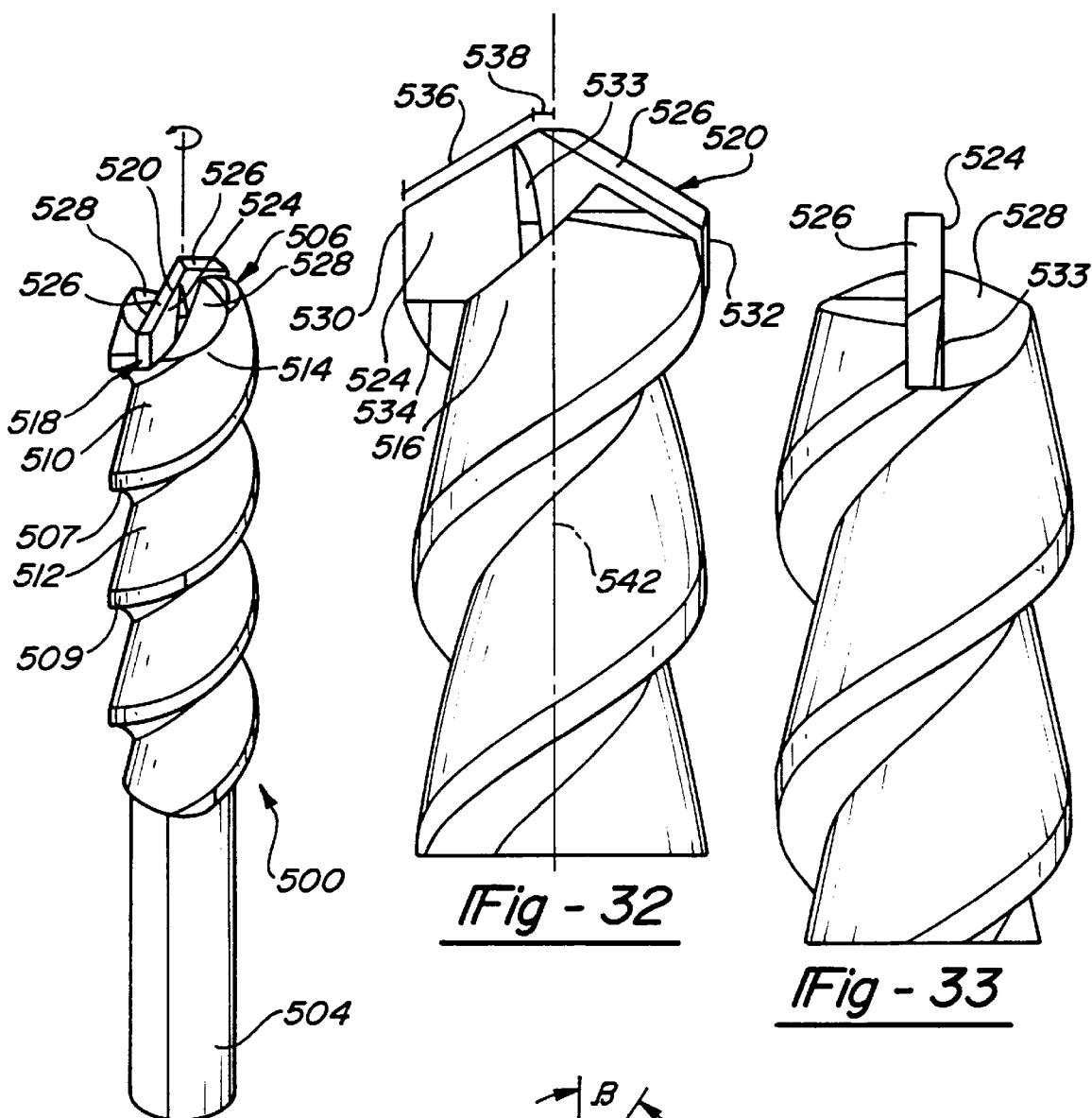
Fig - 31
Fig - 32
Fig - 33
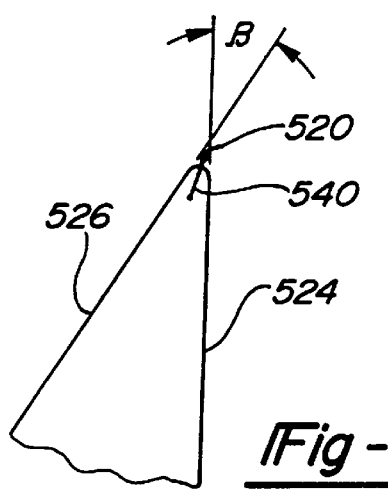
Fig - 36

CUTTING TOOLS FOR DRILLING CONCRETE, AGGREGATE, MASONRY OR THE LIKE MATERIALS

This is a division of U.S. patent application Ser. No. 08/513,586 filed Aug. 10, 1995, now abandoned which is a continuation-in-part of U.S. patent application Ser. No. 08/354,349 filed Dec. 12, 1994 now abandoned.

BACKGROUND OF THE INVENTION

The present invention relates to cutting tools or drill bits, and more particularly, to cutting tools which are used in hammering, percussive, or rotary boring or drilling applications in concrete, aggregate, masonry or the like material.

When drilling concrete, aggregate or the like materials, generally three different types of cutting tools or bits are used. These bits can be defined as hammer bits, percussive bits, and rotary masonry bits. In a true hammer bit, the bit is placed into a driver which includes a hammer which is sequentially and repetitiously moved toward and away from the bit. This hammering action hammers the bit. While the bit is being hammered, the bit continues to either passively or actively rotate. Thus, this type of cutting would be synonymous with using a chisel and hitting it with a hammer. Also, the driver may include a rotational feature where the bit is hammered and actively rotated.

In percussive drilling, the drive includes a chuck which is associated with stepping cam surfaces on gears which are rotated and, at the same time, moved up and down within the driver. Thus, the entire chuck mechanism rotates and moves up and down during the cutting process.

A rotary masonry bit is positioned into a driver which provides only a rotary movement. Thus, the rotary masonry bit does not move up and down and just rotates to cut at the concrete or aggregate.

Cutting tools in these three fields require different parameters for each type of application. In hammer and percussive bits, which utilize a chiseling action, the tip cutting angle, which provides tip strength, debris elimination and a cutting or rake face are a primary concern. Likewise, in rotary masonry drilling, which uses purely rotary movement, the cutting or rake face, debris clean out and cutting angle are also of primary importance. However, all of these elements are interrelated to provide an optimum cutting tool or drill bit to drill concrete, aggregate and the like materials.

Existing hammer and percussive cutting tools ordinarily include carbide insert tips with cutting edges which have large obtuse included angles as well as a negative rake face at large acute angles. Thus, the tip has been utilized to chisel and rotate to drill or bore into the concrete material. The rotary masonry bits ordinarily use a rake face on the bit so that when it is rotated, it will bore through the concrete material.

Further, when the carbide tips are formed, the carbide powder is laterally pressed into a mold to form the tip. This tip is inserted directly and welded or brazed onto a tool shank. Thus, this is the art accepted way to form current design tools or bits.

SUMMARY OF THE INVENTION

Accordingly, it is an object of the present invention to provide the art with a cutting tool or bit which will reduce the time to drill holes into concrete, aggregate or the like material and improve the quality of the hole. The present invention has an improved cutting tip with a rake face which is slightly negative, zero or positive. The tip cutting angle, which is the angle between the rake face and clearance face, is smaller than current designs to provide better chiseling action. Also, the insert can be formed from pressed powder and maintain the desired tip cutting angle. The debris recess of the present invention rapidly ejects debris from the tip into the helical flutes. A rake face on the cutting tools increases cutting action during rotation of the cutting tools in the hole.

Also, in accordance with one aspect of the present invention, the formed carbide tip is worked, contrary to conventional teaching, to increase performance of the tip in drilling concrete, aggregate, masonry or the like material. The term "works" means the tip is ground or otherwise to sharpen or form a sharpened cutting edge on the tool. In another aspect, it has been found that the insert can be pressed powdered metal and still maintain the desired tip cutting angle. Further, in a ball head design tool, the present invention has a larger egress space. Egress space is defined as the open volume through which debris may pass on its way from being created to the flute of the bit to enable faster removal of debris.

In accordance with a second aspect of the invention, a cutting tool comprises a longitudinally extending shank portion which defines a longitudinal axis and two ends. One end has a chucking part and the other end has a cutting head. A cutting edge is on the cutting head and includes at least one cutting portion. A rake surface is formed adjacent to at least one of the cutting portions. Also, a clearance face is formed adjacent to the at least one cutting portion opposite the rake face. An edge radius is formed between the rake face and the clearance face and has a radius from about 0.0005 to 0.001 inch. Likewise, a method of boring a hole in concrete, aggregate or the like material is disclosed using the above cutting tool. The cutting edge of the cutting tool is placed in contact with the concrete, aggregate or the like material. The cutting tool is rotated to bore the material. Due to the boring, a hole is formed in the material. Alternately, instead of rotating the tool, the tool may be impacted to chisel away the material to form the hole. Optionally both boring and impacting may be conducted simultaneously.

In accordance with a third aspect of the invention, a cutting tool includes a longitudinally extending shank with a chucking end and a cutting head. A cutting edge is formed in the cutting head with at least one cutting edge portion. A rake surface is formed adjacent to at least one of the cutting portions with the rake face at an angle of from about −10° to 10°. A method for boring a hole in concrete, aggregate or the like material is disclosed using the above cutting tool. The cutting edge of the cutting tool is placed in contact with the material. The cutting tool is rotated to bore the material. Due to the boring, a hole is formed in the material. Alternatively, instead of rotating the tool, the tool may be impacted to chisel away the material to form the hole. Optionally both boring and impacting may be conducted simultaneously.

In accordance with a fourth aspect of the invention, a cutting tool includes a shank portion with a chucking end and a cutting head. The head includes a cutting edge with at least one cutting edge portion. A rake surface is formed adjacent to at least one cutting edge portion. Additionally, a clearance surface, is formed adjacent to the at least one cutting portion opposite the rake face. One or both the rake surface and clearance surface are worked to form a sharpened edge radius. A method of boring a hole in concrete, aggregate or the like material is disclosed using the cutting tool. The cutting edge of the cutting tool is placed in contact with the material. The cutting tool is rotated to bore the material. Due to the boring, a hole is formed in the material. Alternatively, instead of rotating the tool, the tool may be impacted to chisel away the material to form the hole. Optionally both boring and impacting may be conducted simultaneously.

In accordance with a fifth aspect of the invention, a cutting tool comprises a longitudinal shank with a chucking part at one end and a cutting head at the other end. The cutting head includes a cutting edge with at least one cutting edge portion. A rake surface is formed adjacent to the at least one of the cutting edge portion. A primary egress surface is formed immediately adjacent the rake surface such that the rake surface, and primary egress surface define a new egress path. A method for boring a hole in concrete aggregate or the like material is disclosed using the above cutting tool. The cutting edge of the cutting tool is placed in contact with the material. The cutting tool is rotated to bore the material. Due to the boring, a hole is formed in the material. Alternatively, instead of rotating the tool, the tool may be impacted to chisel away the material to form the hole. Optionally both boring and impacting may be conducted simultaneously.

In accordance with a sixth aspect of the invention, a cutting tool comprises a longitudinally extending shank with a chucking part at one end and a cutting head at the other end. The cutting head includes a cutting edge with at least one cutting edge portion. A rake surface is formed adjacent to the at least one cutting edge portion. The rake surface includes a worked portion which extends from the cutting edge portion to define a length of relief. The depth of the length of relief is a ratio to tool diameter of about 0.10 to 0.32 inches per inch diameter of the tool. A method for boring a hole into concrete, aggregate or the like material is disclosed using the above cutting tool. The cutting edge of the cutting tool is placed in contact with the aggregate. The cutting tool is rotated to bore the material. Due to the boring, a hole is formed in the material. Alternatively, instead of rotating the tool, the tool may be impacted to chisel away the material to form the hole. Optionally both boring and impacting may be conducted simultaneously.

In accordance with a seventh aspect of the invention, a cutting tool comprises a longitudinally extending shank portion which defines a longitudinal axis and two ends. One end has a chucking part and the other end has a cutting head. A press powdered metal cutting insert is secured on the cutting head. A cutting edge is on the cutting insert and includes at least one cutting portion. A rake surface is formed, during pressing of the powder, adjacent to at least one of the cutting portions. Also, a clearance face is formed adjacent to the at least one cutting portion opposite the rake face. An edge radius is formed between the rake face and the clearance face and has a radius of from about 0.0015 to 0.004 inch. Likewise, a method of boring a hole in concrete aggregate or the like material is disclosed using the above cutting tool. The cutting edge of the cutting tool is placed in contact with the concrete aggregate or the like material. The cutting tool is rotated to bore the material. Due to the boring, a hole is formed in the material. Alternatively, instead of rotating the tool, the tool may be impacted to chisel away the material to form the hole. Optionally, both boring and impacting may be conducted simultaneously.

In accordance with an eighth aspect of the invention, a cutting tool includes a longitudinally extending shank with a chucking end and a cutting head. A cutting insert is secured in the cutting head. A cutting edge is formed in the cutting insert with at least one cutting edge portion. A rake surface is formed, during the powder pressing process, adjacent to at least one of the cutting edge portions with the rake face at an angle from 0° to about 10°. A method for boring a hole in concrete, aggregate or the like materials disclosed using the above cutting tool. The cutting edge of the cutting tool is placed in contact with the material. The cutting tool is rotated to bore the material. Due to the boring, a hole is formed in the material. Alternatively, instead of rotating the tool, the tool may be impacted to chisel away the material to form the hole. Optionally, both boring and impacting may be conducted simultaneously.

In accordance with a ninth aspect of the invention, an insert is formed by a press powdered metal operation. A mold is provided with an insert cavity which defines a longitudinal axis and has an opening along the longitudinal axis. Powdered metal material is added into the mold. The powdered metal material is compressed in the direction of the longitudinal axis to form the insert. The method forms inserts like that described in the seventh and eight aspects. The method includes a V-shaped punch to compress the powdered metal material. Also during compressing of the insert, a land is formed on the face of the insert. The land is at an acute angle and counter clockwise with respect to the axis of the insert. The land and the rake face may be joined in a radius.

Additional objects and advantages of the invention will be apparent from the detailed description of the preferred embodiment, the appended claims and the accompanying drawings, or may be learned by practice of the invention.

BRIEF DESCRIPTION OF THE DRAWINGS

The accompanying drawings, which are incorporated in and constitute a part of the specification, illustrate two embodiments of the present invention and together, with the description, serve to explain the principles of the invention. In the drawings, the same reference numeral indicates the same parts.

FIG. 1 is a perspective view of a prior art cutting tool.

FIG. 2 is a side plan view of the cutting tool of FIG. 1.

FIG. 3 is a side plan view, rotated 90°, of the cutting tool of FIG. 1.

FIG. 4 is a top plan view of the cutting tool of FIG. 1.

FIG. 5 is an auxiliary view along the cutting edge of the cutting tool of FIG. 2 illustrating the rake surface.

FIG. 6 is a perspective view of another prior art cutting tool.

FIG. 7 is a side plan view of the cutting tool of FIG. 6.

FIG. 8 is a side plan view, rotated 90°, of the cutting tool of FIG. 6.

FIG. 9 is a top plan view of the cutting tool of FIG. 6.

FIG. 11 is an enlarged side plan view of a cutting radius of FIGS. 5 and 10 in circle 11.

FIG. 12 is a perspective view of a cutting tool in accordance with the present invention.

FIG. 13 is a side plan view of the cutting tool of FIG. 12.

FIG. 14 is a side plan view, rotated 90°, of the cutting tool of FIG. 12.

FIG. 15 is a top plan view of the cutting tool of FIG. 12.

FIG. 16 is an auxiliary view along the cutting edge of the cutting tool of FIG. 12 illustrating the rake surface.

FIG. 17 is a perspective view of an alternate embodiment of the present invention.

FIG. 18 is a side plan view of the cutting tool of FIG. 17.

FIG. 19 is a side plan view, rotated 90°, of the cutting tool of FIG. 17.

FIG. 20 is a top plan view of the cutting tool of FIG. 17.

FIG. 22 is an enlarged view of the edge radius of FIGS. 16 and 21 within circle 22.

FIG. 23 is a side plan view, partially in section, of the cutting tool of FIG. 12 rotating within a material.

FIG. 24 is a view like FIG. 23 with the cutting tool impacting or chiseling the material.

FIG. 25 is a partial cross section of a side plan view of the cutting tool of FIG. 17 in the material during rotary boring.

FIG. 26 is a figure like that of FIG. 25 with the cutting tool impacting or chiseling the material.

FIG. 27 is a figure like that of FIG. 25 with the cutting tool rotating and impacting or chiseling the material.

FIG. 28 is an auxiliary view along the cutting edge of a cutting tool of an alternate embodiment illustrating an arcuate first egress surface and area.

FIG. 29 is a side plan view of another embodiment of a cutting tool with a 180° included angle.

FIG. 30 is a side plan view like FIG. 29 rotated 90°.

FIG. 31 is a perspective view of an alternate embodiment of the present invention.

FIG. 32 is a side plan view of the cutting tool of FIG. 31.

FIG. 33 is a side plan view, rotated 90°, of the cutting tool of FIG. 31.

FIG. 36 is an enlarged view of the edge radius of FIG. 34.

DESCRIPTION OF PRIOR ART DRAWINGS

Figure 10A:
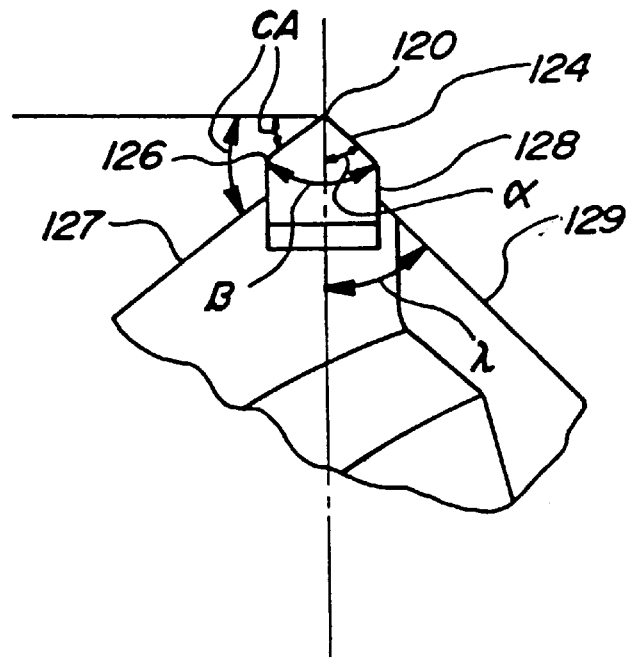
FIG. 10 is an auxiliary view along the cutting edge of the cutting tool of FIG. 7 illustrating the rake surface.

Turning to FIGS. 1 through 11, two prior art cutting tools are illustrated. FIGS. 1 through 5 illustrate a ball head single flute cutting tool, while FIGS. 6 through 10 illustrate a double helix cutting tool. FIG. 11 illustrates the edge radius of both the cutting tools.

The ball head single helix cutting tool is designated with the reference numeral 100 and the double helix reference tool is designated with the reference numeral 102. The single flute cutting tool 100 has a chucking end 104 for a hammer driver and a ball cutting head 106. The shank 108 has the single helix 110 defining a flute 112. The flute 112 ends at the cutting head 106 at a debris channel 114. Also, an additional debris channel 116 is on the opposing side of the head, which dumps directly into the flute 112, as seen in FIG. 3.

The cutting head 106 includes an insert 118, which includes a cutting edge 120, either brazed or welded or the like into a slot 122 in the cutting head 106. The insert is formed by placing powdered carbide into a mold and compressing it. The insert is directly welded or brazed as described.

The cutting edge 120 is defined by rake faces 124, edge radius 125, and clearance faces 126. Ordinarily, first egress faces 128 are directly adjacent to the rake faces and egress area 129 forms the remainder of the egress portion. The egress area 129 may be on the same angle as the rake faces 124. The rake angle is negative and is about −30° to about −40°. The egress faces 128 lead into the debris channel 114, 116. The rake faces 124 have a substantial negative rake angle with the exception of some percussive bits which are at 0°. The edge radius 125, as can best be seen in FIG. 11, is between the rake faces 124 and clearance faces 126 and, as can be seen, is relatively dull and is on the order of 0.004 to 0.008 inch as measured on some prior art examples. However, in rotary only bits, while these bits may have 0° rake angles, the edge radius is in the mentioned range. Also, the rake face 124 and clearance face 126 define a cutting angle between the two surfaces. The cutting angle is important for chiseling action and is about 45° to 110°. Thus, with the negative rake angle and the dull edge radius, the cutting tool 100, 102, as it rotates, glides inside the hole, synonymous to spreading butter with a knife, smoothing away debris within the hole. This requires substantial force to initiate cutting of the hole in the concrete, aggregate or the like material.

In the double helix cutting tool 102, the chucking end 104' is different from that of the single flute cutting tool 100 to illustrate a rotary or percussive type chucking end. The tool includes helixes 111 and 113 as well as flutes 115 and 117. As the flutes end at the cutting head 106, the debris channels 114 and 116 are formed at the end of each of the flutes.

The cutting tip insert 118 is the same as that previously described and the rake faces 124, cutting edge 120, clearance surfaces 126 and first egress surface 128' and egress area 129' are identified with the same numbers. However, the egress area 129' is different than that in the single flute design. Here, the egress area is parallel to the rake face. Also, the debris channels 114', 116' are substantially identical.

Both of these cutting tools illustrate a cutting tip having a large obtuse included angle between the two cutting edges on the order of 120° to 130°. Also, the egress angle, ordinarily about 30° to 35°, defining the plane of the egress area is relatively shallow. Likewise, the clearance angle, ordinarily about 20° to 30°, which defines the plane of the clearance surface is also shallow. Also a cutting angle, between the rake face and clearance face, is ordinarily about 90 to 110.

When defining angle measurement, the angles are true angles. True angles are taken by defining a plane parallel to the center line of the tool and through the cutting edge in an auxiliary view with the cutting edge as a point. See FIGS. 5, 10, 16, 21. The rake angle, designated by $\alpha$, is the angle measured from the defined plane to the rake face. The clearance angle, designated by CA, is the complement of the angle measured from the defined plane to the clearance face. The cutting angle, designated by $\beta$, is the angle between the clearance face and rake face. The cutting angle $\beta$ is equal to $\alpha+(90-CA)$. The egress angle, designated by $\lambda$, is the angle from the defined plane to the egress face. Positive rake angles are defined by clockwise rotation from a point on the defined plane at the cutting edge to the rake face, when viewed along the cutting edge from the outside diameter of the bit. Negative rake angles are defined by counterclockwise rotation from a point on the defined plane at the cutting edge to the rake face, when viewed along the cutting edge from the outside diameter of the bit.

DETAILED DESCRIPTION OF THE PREFERRED EMBODIMENT

Turning to FIGS. 12 through 26, embodiments of the present invention are shown. FIGS. 12 through 16 illustrate a single helix design, designated with the reference numeral 200, and FIGS. 17 through 21 illustrate a double helix design, designated with the reference numeral 300, respectively.

The single helix cutting tool 200 includes a chucking end 204, in this particular case illustrated as a spline for a hammer driver, however, a percussive and/or a cylindrical rotary end or other attachment and drive means could be used. A cutting head 206 is at the other end of the cutting tool 200 and a shank 208 is between the two ends. The helix 210 defines a flute 212. The flute 212 ends at the cutting head 206 into a debris channel or recess 214. Likewise, a second debris channel or recess 216 is cut into the cutting head 206 opposing the recess 214.

The cutting head 206 includes an insert 218 which includes cutting edge 220, rake faces 224, and clearance faces 226. Likewise, egress faces 228 are immediately adjacent the rake faces 224.

The insert 218 has an overall pentagonal shape of a house with the cutting edge 220 defining the roof, sides 230 and 232, and a base 234 which is substantially perpendicular to the two parallel sides 230 and 232. Also, the cutting edge could be along a straight line to provide a rectangular insert, as seen in FIG. 29 and 30. Here corresponding reference numerals are increased by 200. Thus, the cutting tool is designated with the reference numeral 400. The insert 218 is brazed, welded or the like into the slot 222 in the cutting head 206. The insert 218 is generally manufactured from a carbide material, such as carbide or tungsten carbide, however, ceramics, ceramic composites, diamond dust, metal ceramic composites or a unitary homogeneous or a deposit of layers could be used. Also, the entire cutting tool could be manufactured from such material or a portion thereof, including the head 206 manufactured from such a material, eliminating the insert 218.

The cutting edges 220 are defined by rake faces 224, edge radius 240 and the clearance faces 226. The cutting edges 220 include a primary cutting edge 236 and a secondary cutting edge 238. The primary cutting edge 236 is on an acute angle with respect to the longitudinal axis 242, while the secondary cutting edge 238 is substantially perpendicular to the longitudinal axis 242.

The cutting edges 220 include edge radius 240 between the rake faces 224 and clearance faces 226 (see FIG. 22). The edge radius 240 defines the sharpness of the cutting tool. An edge radius 240 of the present invention is generally between 0.0003 to 0.004 and preferably between 0.0005 to 0.001. Having a desired edge radius 240 provides a desired sharpness to enable the cutting tool to cut through the concrete, aggregate or the like material during rotation of the cutting tool. The edge radius is formed by working, such as by grinding or the like, the clearance face and the rake face.

The two cutting edges 220 form a tip or point 221 between them. The included angle (IA) between the two cutting edges 220 is from about 90° to 180° and preferably about 100 to 160.

The cutting edges 220 are offset from the longitudinal axis 242 of the cutting tool 200. The rake faces 224 are worked or ground into the insert and define rake angles α as defined above. Generally, the rake angle α is between 10° to −10°, preferably at about 0° for the primary cutting edge portion 236. The rake angle is between −50° to −20° preferably −40° for the secondary cutting edge portion 238. Thus, the worked rake surfaces are substantially parallel to the longitudinal axis 242.

The rake faces 224 are formed by working, such as grinding or the like, into both sides of the insert 218 and extend a desired distance from the cutting edge 220. The distance or depth which the rake faces 224, which are worked or ground into the insert, extend from the cutting edge is known as the length of relief. The depth of the length of relief is measured from the cutting edge 220 along the longitudinal axis 242 to a first egress surface 244. The length of relief of the rake faces 224 has a depth of about 0.08 to about 0.25 inch for a ¾ inch diameter bit. Preferably, the depth is from about 0.15 to about 0.25 inch. The length of relief can be defined as a ratio with respect to the diameter of the tool. Thus, the length of relief ratio is about 0.10 to about 0.32 inches per inch diameter of the tool.

Figure 21A:
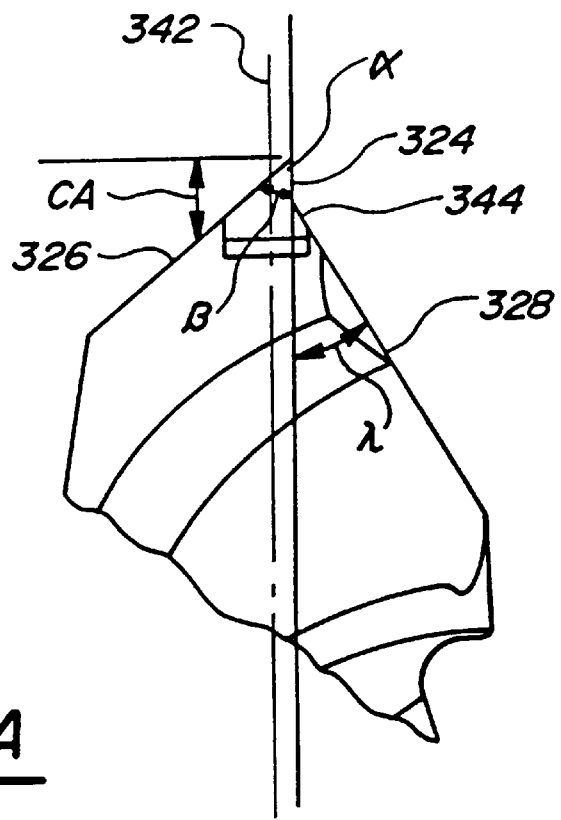
FIG. 21 is an auxiliary view along the cutting edge of the cutting tool of FIG. 17 illustrating the rake surface.
Figure 34:
FIG. 34 is an auxiliary view along the cutting edge of the cutting tool of FIG. 31 illustrating the rake surface.
Figure 35:
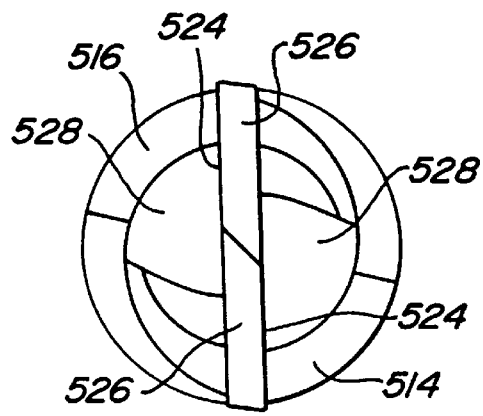
FIG. 35 is a top plan view of the cutting tool of FIG. 31.
Figure 37:
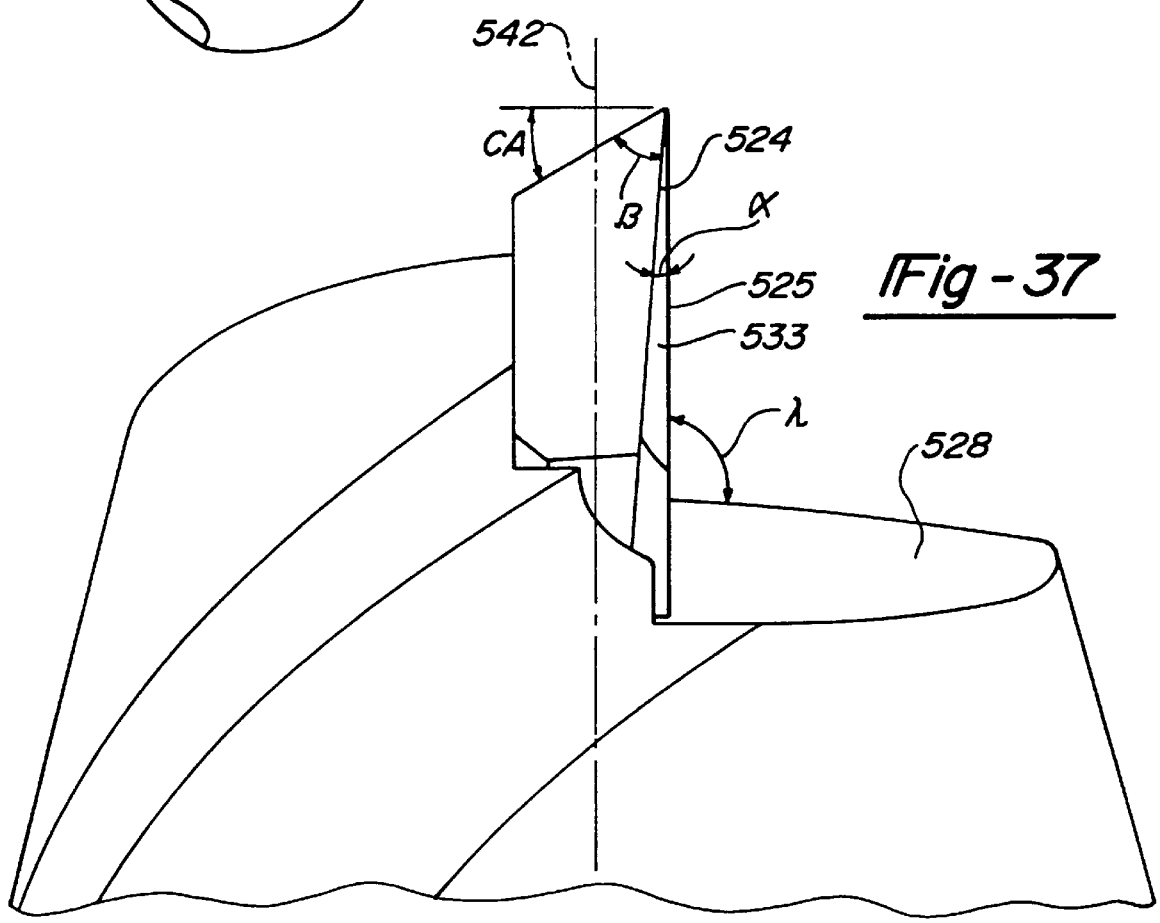
FIG. 37 is an enlarged auxiliary view like that of FIG. 34.
Figure 38:
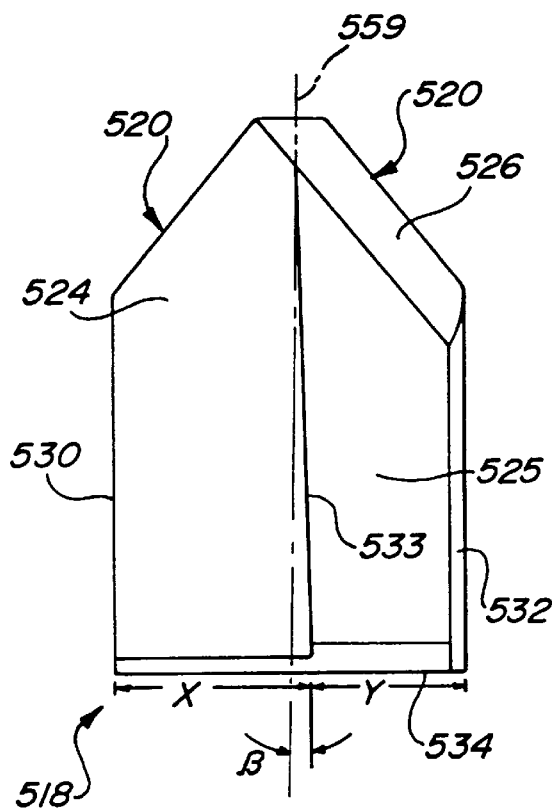
FIG. 38 is a plan view of an insert in accordance with the present invention.

The first egress surface 244 angles from the terminus or end of the length of relief. The first egress surface 244 is generally angled with respect to the rake face 224, providing an overall stepped cutting head, as seen in FIGS. 16 and 21. The angle of the first egress surface 244 is from about 30° to 90° and preferably 55° to 60° and may be continuous with and at the same angle as the egress area 228.

The clearance surface 226, which includes a portion of the insert 218 and the cutting head 206 define a clearance angle CA. The clearance angle CA is defined as mentioned above. This clearance angle is from about 10° to about 50° and preferably about 20° to 40° for hammer and percussive tools and 30° to 50° for rotary only tools.

A cutting angle β, as defined above, is defined between the clearance face 226 and rake face 224. The cutting angle β is from about 30° to 90° and preferably from about 40° to 60° for the primary cutting edge portion. The cutting angle for the secondary cutting edge portion varies from 60° to 120° preferably from 80° to 100°. These cutting angles define a primary cutting edge portion which enhances cutting action, while the cutting angle defined for the secondary cutting edge portion enhances the chiseling action of the cutting tool.

The egress area 228 defines an egress angle λ which is measured as mentioned above. The egress area 228 is adjacent to the first egress surface 244. The angle is at least 0° and preferably from about 30° to 60° for hammer and percussive tools and at about −20° to 90° for rotary only tools, preferably about −20° to 20° for hammer and percussive tools and 45° to 105° for rotary only tools. Also, the first egress surface 244' and egress area 228 may be arcuate as seen in FIG. 28. Here they are shown on the same arc, however, they could be on different arcs. This egress angle and surface enhance the transport of debris from the tool tip into the flute 212 of the shank 208. Thus, by providing a desired egress angle, choking is prohibited at the cutting head 206. As seen in FIGS. 12 through 16, a larger volume of material is removed from the ball head enabling better debris removal.

Turning to FIGS. 17 to 21, the double helix embodiment of the present invention is shown. The cutting tool 300 includes a chuck end 304 which is a rotary or percussive type of cutting tool end. Also, the helixes 307 and 309 and flutes 310 and 312 are different from those previously described. The helixes 310 and 312 end at the cutting head 306, thus enabling the debris recesses 314 and 316 to include a larger volume of debris. The remaining portions of the cutting head 306 are designated with reference numerals increased by a hundred and the description is the same as in the first embodiment since these elements are the same. The difference in the head 306 in the egress area 328 and clearance surface 326 is due to a reduced amount of material present in the double helix design than is present in the single helix design. Otherwise, the angle parameters previously described are the same with the double helix design as they are with the single helix design.

Turning to FIGS. 23 through 27, the cutting tools of the present invention are illustrated in concrete, aggregate or the like material, boring a hole. When the terms concrete, aggregate or the like material are used, the cutting tools may be used to bore, but are not limited to, cap block, brick, stone, ceramic materials, concrete, aggregate, black top, rock, cement, masonry or the like materials. In drilling a hole using rotary only motion, the bit of the present invention contacts the concrete, aggregate or the like material. The cutting tool may be rotated only where the rake face of the cutting tool cuts and bores a hole into the material. Alternatively, the cutting tool contacts the concrete, aggregate or the like material and impacts or chisels the material to form a hole. Further, the cutting tool may contact the material and impacting and rotating movement utilized together to bore a hole as seen in FIG. 27. Generally, the impacting is sequential and repetitious so that a constant repeating force is applied onto the cutting tool. Also, when the cutting tool is purely rotational, a constant force may be applied to the driver.

FIGS. 31 through 37 illustrate a double helix embodiment of the present invention. Cutting tool 500 includes a chuck end 504 which is a rotary or percussive type of cutting tool end. Also, the helixes 507 and 509 and the flutes 510 and 512 are like those previously described with respect to FIGS. 17 through 21. The helixes 510 and 512 end at the cutting head 506, thus enabling the debris recesses 514 and 516 to include a larger volume of debris.

The cutting head 506 includes an insert 518 which includes cutting edges 520, rake faces 524 and clearance faces 526. Likewise, egress faces 528 are immediately adjacent the rake face 524.

The insert 518 has an overall pentagonal shape of a house with the cutting edge 520 defining the roof, sides 530 and 532, and a base 534, which is substantially perpendicular to the two parallel sides 530 and 532. Also the cutting edges 520 could be along a straight line to provide a rectangular insert as seen in FIGS. 29 and 30.

The insert 518 is braised, welded or the like into the slot 522 on the cutting head 506. The insert 518 is generally manufactured from a carbide material such as a cobalt carbide mixture however, ceramic, ceramic composites, diamond dust, metal ceramic composites or a unitary homogeneous or a deposit of layers could be used.

Cutting edges 520 are defined by rake faces 524, edge radii 540 and clearance faces 526. The cutting edges 520 include a primary cutting edge 536 and a secondary cutting edge 538. The primary cutting edge 536 is on an acute angle with respect to a longitudinal axis 542, while the secondary cutting edge 538 is substantially perpendicular to the longitudinal axis 542. The cutting edges 520 include edge radius 540 between the rake faces 524 and clearance faces 526 as seen in FIG. 36.

The edge radius 540 defines a sharpness of the cutting tool. An edge radius 540 of the present invention is between 0.0015 to 0.004 and preferably between 0.002 to 0.003. Having a desired edge radius 540 provides a desired sharpness to enable the cutting tool to cut through the concrete, aggregate or the like material during rotation of the cutting tool. The edge radius as mentioned above is formed during the powder pressing operation.

The included angle between the two cutting edges is like those previously described. Also, the rake face angle α is between 10° and 0° preferably at about 5°. However, these angles are formed during the pressing operation. Also, the angles of the primary and secondary cutting edge are similar to those described above. The clearance angle CA as well as the cutting angle β are the same as those described above.

In this embodiment, a first egress surface is eliminated and an egress area 528 is defined by an egress angle λ which is measured as mentioned above. The egress area 528 is adjacent to the rake face 524. The angle is between 80° and 100° and is preferably about 90°.

For a better understanding of molding the insert, refer to FIG. 38 through 41.

The insert 518 is illustrated with a clearance face 526, rake faces 524 and a trailing face 525. The land 533 is formed between the clearance face 524 and the trailing face 525. The width (X) of the rake face 524, at the bottom of the insert, along the base 534 is wider than the width (Y) of the trailing face 525 such that an angle B is formed along the land 533 with respect to the central axis 559. The line extending from the land 533 is on an angle which is counter clockwise away from the central axis. This angle enables the insert to be removed from the mold.

Figure 39:
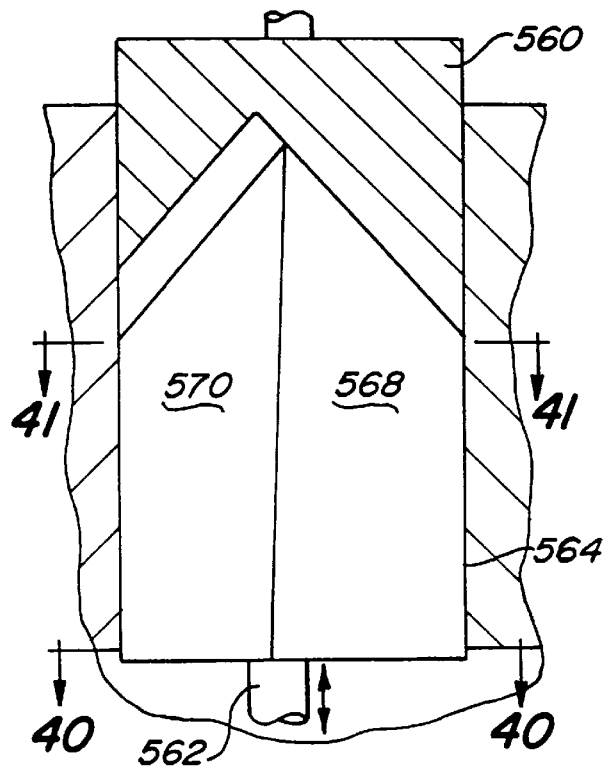
FIG. 39 is a schematic elevation view of a mold in accordance with the invention.
Figure 40:
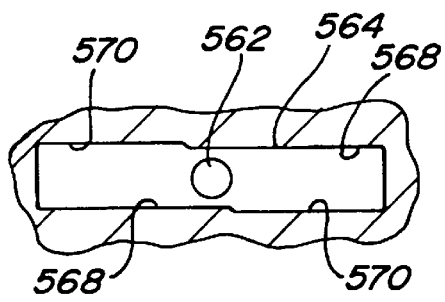
FIG. 40 is a section view along line 40—40 of FIG. 39.
Figure 41:
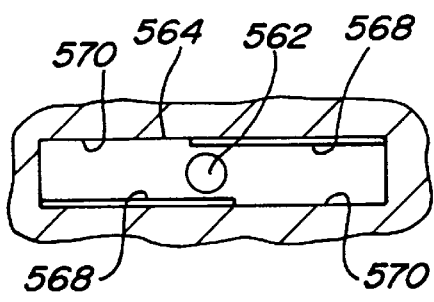
FIG. 41 is a section view along line 41—41 of FIG. 39.

Turning to FIG. 39, a mold and punch is illustrated. A V-shaped punch 560 forms the roof of the insert 518 and an ejector pin 562, in the mold 564, ejects the insert after it has been molded. Powdered metal is poured into the mold 564 and the punch 560 is inserted compressing the powder metal within the mold 564. Upon compressing the powdered metal, as seen in FIG. 40, at the bottom of the mold 564, the portion 568 of the mold 564 forming the rake face 524 extends inward from the portion 570 of the mold 564 that forms the trailing face 525. At the top of the mold 564, the width of the molds are substantially the same as seen in FIG. 41. Thus, when the insert 518 is ejected from the mold 564, since the bottom portion of the rake face 524 is in an area as it exits the mold which is wider than the rake face base portion of the insert 518, the insert 518 is easily ejected from the mold 564. However, if the angle B was clockwise with respect to the central axis 559, the land would be formed in the opposite direction and the insert would be jammed within the mold since the bottom of the insert would be wider than the width of the top of the mold.

By having the punch 560 move axially with respect to the insert, the desired rake faces 524 and clearance faces 526 as well as the edge radii 540 are formed on the insert 518. The above identified insert 518 forming is contrary to conventional molding of positive rake carbide inserts, which moves a punch laterally or perpendicular to the axis of the insert, to form the insert.

To manufacture a cutting tool in accordance with the invention, ordinarily the tool would be made in methods consistent with those in the art. To provide a tip with surfaces like those disclosed, ordinarily the rake surfaces, egress surfaces and clearance surfaces would be ground or formed by other conventional means into the cutting tool to form the desired surfaces with desired angles.

While the above detailed description describes the preferred embodiment of the present invention, the invention is susceptible to modification, variation, and alteration without deviating from the scope and fair meaning of the subjoined claims.

We claim:

1. A method of forming an insert comprising:

providing a mold with an insert cavity defining a longitudinal axis and having an opening along the longitudinal axis and said insert cavity having a substantially planar base for defining a base of the insert;

adding powder material into the mold;

compressing the material in the direction of the longitudinal axis;

forming the insert with a positive rake face, a substantially planar base, and a V-shaped cutting edge.

2. The method of forming an insert according to claim 1 further comprising a V-shaped punch compressing said powder material.

3. The method of forming an insert according to claim 1 and forming a land on a face of said insert, said land being at an acute angle and counter clockwise with respect to an axis of the insert.

4. The method of forming an insert according to claim 1, wherein said insert has a desired rake face, clearance face and edge radius.

5. The method of forming an insert according to claim 1 and ejecting the insert from the mold.

* * * * *